April 23, 1935.　　　R. N. BUNSTINE　　　1,998,775

SURVEYOR'S OR ENGINEERING TRANSIT

Filed Dec. 4, 1933

Roy Neil Bunstine,
INVENTOR

BY Victor J. Evans
and Co. ATTORNEY

Patented Apr. 23, 1935

1,998,775

UNITED STATES PATENT OFFICE 1,998,775

SURVEYOR'S OR ENGINEERING TRANSIT

Roy Neil Bunstine, San Pedro Sula, Honduras

Application December 4, 1933, Serial No. 700,921

2 Claims. (Cl. 88—2.2)

The invention relates to transits and more particularly to instruments requiring plumbing and leveling before use and especially to surveyors' or engineering transits.

The primary object of the invention is the provision of a transit of this character, wherein the simultaneous plumbing or centering and leveling of the transit without the use of a plumb bob may be had with accuracy and rapidity and more ease than with a bob.

Another object of the invention is the provision of a transit of this character, wherein the finder is disposed for the convenience of the user of the instrument and both center image and level bubble appear directly under or over cross hairs when the instrument is plumbed and leveled, the slightest deviation from a plumb or level position being instantly visible by the operator on glancing at the finder. The transit using a plumb bob in a wind may be shifted considerably from plumb without such shift being visible to the operator and the present transit eliminates the loss of time and difficulty of trying to plumb a transit with a bob in a strong wind when it is almost impossible to accurately center or maintain a center due to unsteady bob and assures accuracy regardless of strength of wind and the centering and leveling of the instrument with greater rapidity than with the use of a bob.

A further object of the invention is the provision of a transit of this character which is comparatively simple in construction, thoroughly reliable and efficient in its purposes, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
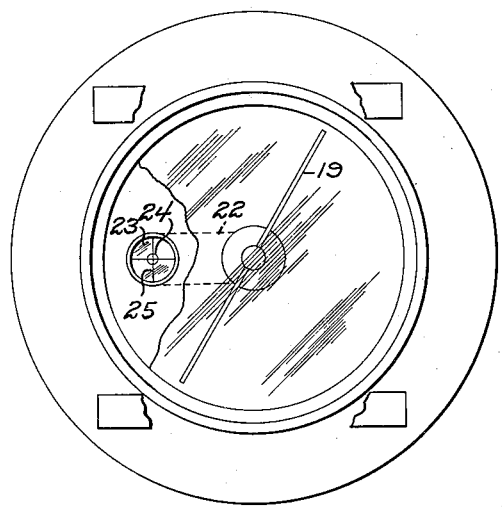
Figure 1 is a top plan view partly broken away showing the transit and its finder constructed in accordance with the invention.
Figure 3:
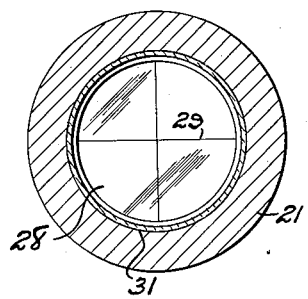
Figure 3 is a sectional view on the line 3—3 of Figure 2 looking in the direction of the arrows.
Figure 2:
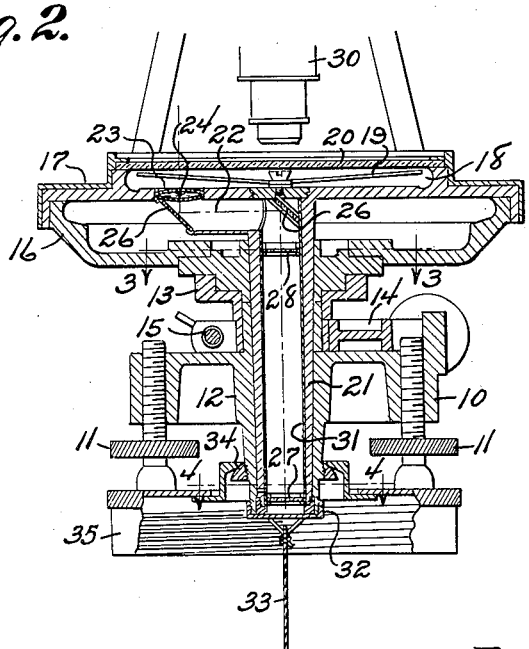
Figure 2 is a vertical longitudinal sectional view.
Figure 4:
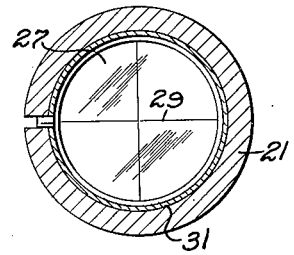
Figure 4 is a sectional view on the line 4—4 of Figure 2 looking in the direction of the arrows.

Referring to the drawing in detail, the transit constituting the surveyor's or engineering instrument comprises the usual leveling head 10 fitted with the leveling screws 11, these being connected with the tripod head (not shown). The leveling head 10 is formed with the outer center spindle 12 about the upper end of which is arranged the clamp collar 13 engaged by the lower clamp 14 having the clamp screw 15.

Carried by the collar is the horizontal circle 16 for the vernier plate 17 provided with the compass box 18 in which is arranged the magnetic needle 19 and covered by the glass 20.

Fitted within the outer spindle 12 is a downwardly tapered hollow inner spindle 21 having formed therewith the laterally and upwardly extending portion 22 at its upper end beneath the vernier plate 17 and opening therethrough into the compass box 18. This opening has fitted therein a finder 23 and a level bubble 24, the finder being provided with cross hairs 25. Arranged within the inner hollow spindle 21 and the portion 22 are the reflectors or prisms 26 and the lenses 27 and 28, respectively, these having the cross hairs 29 so that a user of the instrument can visually determine with accuracy the plumbing or centering and the leveling of the transit, its telescope being indicated at 30 by the finder 23 since both center image and level bubble appear directly under or over cross hairs 25 of the finder 23 when the instrument is plumbed and leveled, the slightest deviation from a plumb or level position being instantly visible to the operator by a glance at the finder.

As has been stated, in the use of this instrument it functions to permit the simultaneous centering and leveling of the transit and maintaining these positions without using a plumb bob and with accuracy and rapidity.

The prisms and lenses confined within the inner spindle 21 each is preferably held in a barrel 31 which is capable of adjustment and removal for the purpose of the accurate setting and also cleaning.

Carried at the lower end of the inner spindle 21 is a removable dust cap 32 for the purpose of supporting a plumb bob, the string thereof being attached to the cap in any suitable manner and the purpose of this bob is to check for accuracy or adjustment of the prism finder. The bob is usable when the instrument is placed within a poorly lighted shaft or excavation.

The outer spindle 12, through the ball and socket arrangement 34, has connection with the transit base plate 35.

It will be apparent that the distinguishing feature of this invention resides in the fact that it does not require a specially constructed transit, with a supporting base structure below spindles 12 and 21.

What is claimed is:

1. In an instrument of the character described, a vernier plate, a compass box having therein a magnetic needle, a hollow spindle depending centrally from the vernier plate, cross-haired lenses arranged within said hollow spindle, a reflector above the lenses and within the spindle, a branch from the spindle opening through the vernier plate, a cross-haired finder and leveling bubble located at the opening through said vernier plate, and a reflector beneath said opening and coacting with the reflector in the hollow spindle.

2. In an instrument of the character described, a vernier plate, a hollow spindle centrally of said plate and opening through the same, a cross-haired finder and leveling bubble located at the opening through said plate, related lenses and reflectors within the spindle and directing an image to the finder, and a bob-carrying dust cap removably fitted on the lower end of the hollow spindle.

ROY NEIL BUNSTINE.